(12) United States Patent
Nomura

(10) Patent No.: US 7,030,521 B2
(45) Date of Patent: Apr. 18, 2006

(54) MOTOR HAVING TWO OR MORE CIRCUIT BOARDS

(75) Inventor: Masashi Nomura, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 10/905,114

(22) Filed: Dec. 16, 2004

(65) Prior Publication Data
US 2005/0134127 A1 Jun. 23, 2005

(30) Foreign Application Priority Data
Dec. 18, 2003 (JP) ............................ 2003-420564

(51) Int. Cl.
*H02K 11/00* (2006.01)
(52) U.S. Cl. .................. 310/68 R; 310/DIG. 6
(58) Field of Classification Search ............. 310/68 R, 310/156.01, 71, 42, 67 R, DIG. 6; 439/78
See application file for complete search history.

(56) References Cited

U.S. PATENT DOCUMENTS 4,875,110 A * 10/1989 Kazama et al. ............... 360/64
6,181,033 B1 * 1/2001 Wright ...................... 310/67 R
6,949,849 B1 * 9/2005 Wright et al. ................ 310/89

FOREIGN PATENT DOCUMENTS

| JP | 07075315 | * | 3/1995 |
| JP | H11-354905 A | | 12/1999 |
| JP | 2002-031084 A | | 1/2002 |

* cited by examiner

Primary Examiner—Darren Schuberg
Assistant Examiner—Erik Preston
(74) Attorney, Agent, or Firm—Judge Patent Firm

(57) ABSTRACT

A motor having a sleeve, a first board, a second board, a rotating part, a stator, a bracket and a bearing. The sleeve includes a sleeve main body having a cylindrical part into which a shaft is inserted, a first board supporting part having a first board supporting area extending in a radial direction of the cylindrical part, and a second supporting part having a second board supporting area that extends in a radial direction of the cylindrical part and is formed apart from the first board supporting area in an axial direction of the cylindrical part. The first board has a first through hole into which the sleeve main body and the second board supporting part are inserted and is fixed to the first board supporting area. The second board has a second through hole into which the sleeve main body is inserted and is fixed to the second board supporting area.

29 Claims, 8 Drawing Sheets

MOTOR HAVING TWO OR MORE CIRCUIT BOARDS

BACKGROUND OF THE INVENTION

1. Field of the Invention

The present invention relates to a motor, in particular, a motor having two-layer circuit boards.

The motor is used for office automation related equipment such as laser beam printers (hereinafter abbreviated as "LBP") and copying machines as well as computer-related equipment.

2. Description of the Related Art

A DC motor generally used for LBPs and copying machines will be described with reference to FIG. 8. To be easily understandable, an upper side in the figure, that is, a rotor side in the motor shaft direction is assumed as an upper side and a lower side in the figure as a lower side in the following description.

Configuration—FIG. 8 is a cross-sectional view showing configuration of a motor 11 conventionally used in LBPs, copying machine, etc. The motor 11 has a static member 22 by which the motor fixed to a product such as a LBP or a copying machine, a bearing 7 located between the static member 22 and a rotational member 3 to support the rotational member rotatably with respect to the static member 22 through the bearing 7.

The static member 22 and the rotational member 3 will be described in detail below.

Static member 22—The static member 22 has a bracket 5 for fixing the motor 11 to the product, a cylindrical sleeve 30, the lower part of which is penetrated into a through hole formed at the bracket 5 and fixed thereto, a circuit board 9 fixed to the lower side of the sleeve 30 and a stator 10 fixed to the peripheral surface on the upper side of the sleeve 30.

The bracket 5 is a plate-like member at which the through hole is formed. A fitting piece 12 with a screw inserting hole is formed one stage lower at four corners of the bracket 5 with being folded, thereby fixing the motor 11 to the product. A connecting piece 13 is formed one stage higher at an end part of the bracket 5 with being folded, so that the circuit board 9 is held fixedly and grounded electrically.

The sleeve 30 is a substantially cylindrical member having a through hole at the center thereof and a flange supporting part 25 on the periphery of the lower side thereof. A supporting plane of the supporting part 25 at the upper side supports the circuit board 9 and a supporting plane of the supporting part 25 at the lower side is supported by the bracket 5.

The circuit board 9 is connected with keeping an electric continuity to the bracket 5 through the connecting piece 13. The circuit board 9 has a circuit components mounting part 26 for mounting a circuit thereon in the region where is not a region opposed to a rotor 19. A circuit component for rotationally driving the rotor 19, that is, a control circuit component 14 for controlling conduction to a stator coil is mounted on one plane of the circuit components mounting part 26.

Rotational member 3—The rotational member 3 has a shaft 20 rotatably supported to the static member 22 through the bearing 7 and the cup-like rotor 19 is fixed to one end of the shaft 20.

The shaft 20 has a cylindrical shape extending in axial direction, which is rotatably supported via the bearing 7 in an inner side of the through hole of the sleeve 30. A rotor 19 is fixed to the upper end of the shaft 20 so as to penetrated thereinto.

The rotor 19 is a cup-like member that has a disc-like bottom part extending in radial direction from the shaft 20 and a cylindrical side parts extending from the bottom part in axial direction. A cylindrical magnet 18 is fixedly fitted onto an inner periphery of the side parts and opposed to the stator 10 fitted onto the sleeve 6 with a small space therebetween.

Operation—When driving current by which magnetic fields are excited around the stator 10, is applied to a three-phase coil of the stator 10, suction and repulsion forces are generated by a mutual interaction between the stator 10 and the magnet 18, thereby to generate a rotational force in the rotor 19. This rotational force is transmitted to the inside of the product through the shaft 20 fixed to the rotor 19.

Circuit board—The circuit board 9 has the circuit components mounting part 26 for mounting a circuit thereon in the region where is a region not opposed to the rotor 19. In other words, when the motor is viewed from an upper side in axial direction, the circuit component mounting part 26 has a larger area in comparison with the area of the motor 11. For this reason, in the case that product such as a LBP or a copying machine is provided with the motor 11, it is necessary to ensure an enough space corresponding to the circuit component mounting part 26 on the circuit board 9.

However, in some products, it may be difficult to ensure such sufficient space on the circuit board 9. In such case, a reduction in space corresponding to the circuit component mounting part 26 is desired.

To address the desire, one possible solution is to adopt two-layer configuration in which the circuit performing an entire control for the motor is separated into two parts and these are allocating into two boards then the two boards are arranged in two layers located in axial direction with a distance. In a general two-layer configuration, a distance between two circuit boards in the axial direction is kept by using cylindrical spacers disposed in the vicinity of the periphery of the circuit boards. Screw holes are formed on the two circuit boards at positions where the board spacers are arranged. Accordingly, the two circuit boards are fixed to fixing members of the motor by screws with sandwiching the board spacers there-between.

This two-layer circuit board configuration requires the spacer to ensure a distance between a first circuit board and a second circuit board. This causes a problem of increasing the number of components and the corresponding costs.

BRIEF SUMMARY OF THE INVENTION

An object of the present invention is to provide a motor having an advantage for cost reduction and to improve the productivity of the motor due to a simplification of manufacturing process.

To achieve the object, in a motor of the present invention, two or more layers of circuit boards for controlling the motor are attached within a motor housing. The motor in connection with the present invention has two or more circuit boards each of which has an inserting hole, and the motor also has a cylindrical sleeve, board attached virtual planes of two or more layers at which the two or more circuit boards are positioned, which are separately arranged in parallel to each other, and board attached parts corresponding to each circuit boards formed at the periphery of the sleeve. Each of the circuit board passes through the sleeve by the inserting hole and is fixed to the board attached part.

Since there are spaces between plural circuit boards, it is unnecessary to use excess members such as spacers. That is, according to the present invention, in particular two circuit boards in the motor, the configuration of the two-layer board is achieved by only applying the insert process of inserting the boards into the sleeve through the inserting hole of the board. For this reason, it becomes possible to reduce costs of the motor and improve the productivity of the motor due to a simplification of manufacturing process.

There and other objects, features and advantages of the present invention will become more apparent upon reading of the following detailed description along with the accompanied drawings.

DETAILED DESCRIPTION OF INVENTION

A motor in accordance with an embodiment of the present invention will be described with reference to FIG. 1 to FIG. 7.

Figure 1:
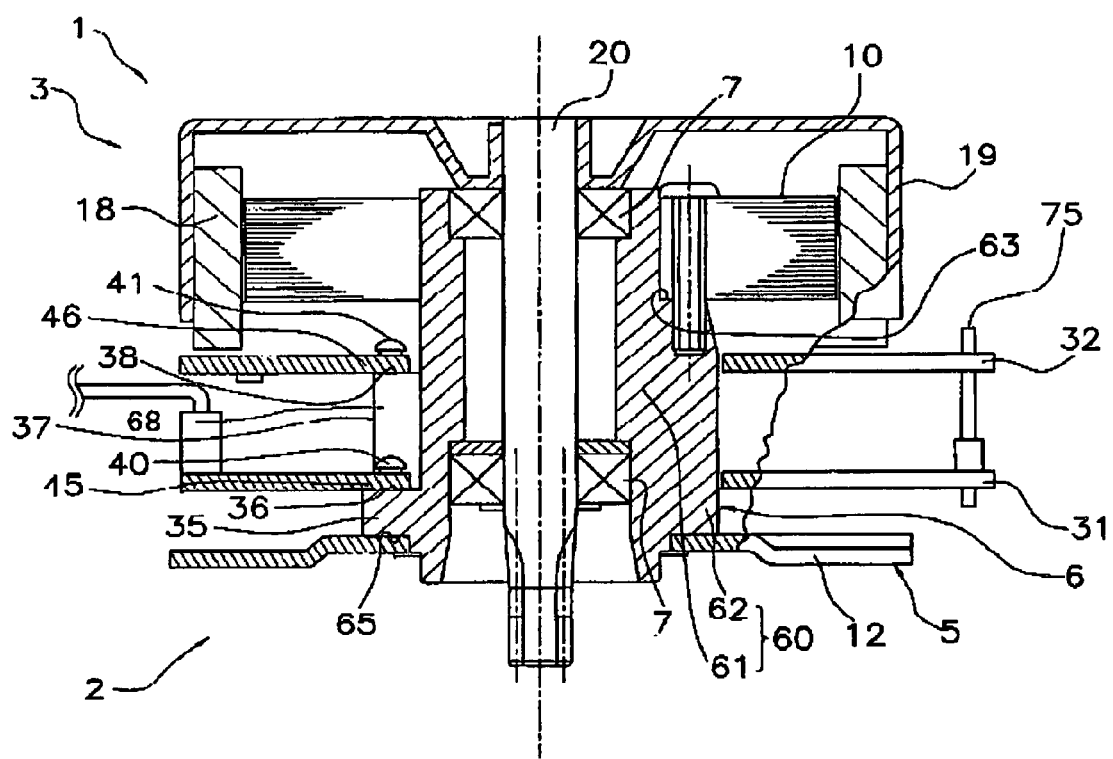
FIG. 1 is a cross-sectional view of a motor 1 in accordance with an embodiment of the present invention.
Figure 8:
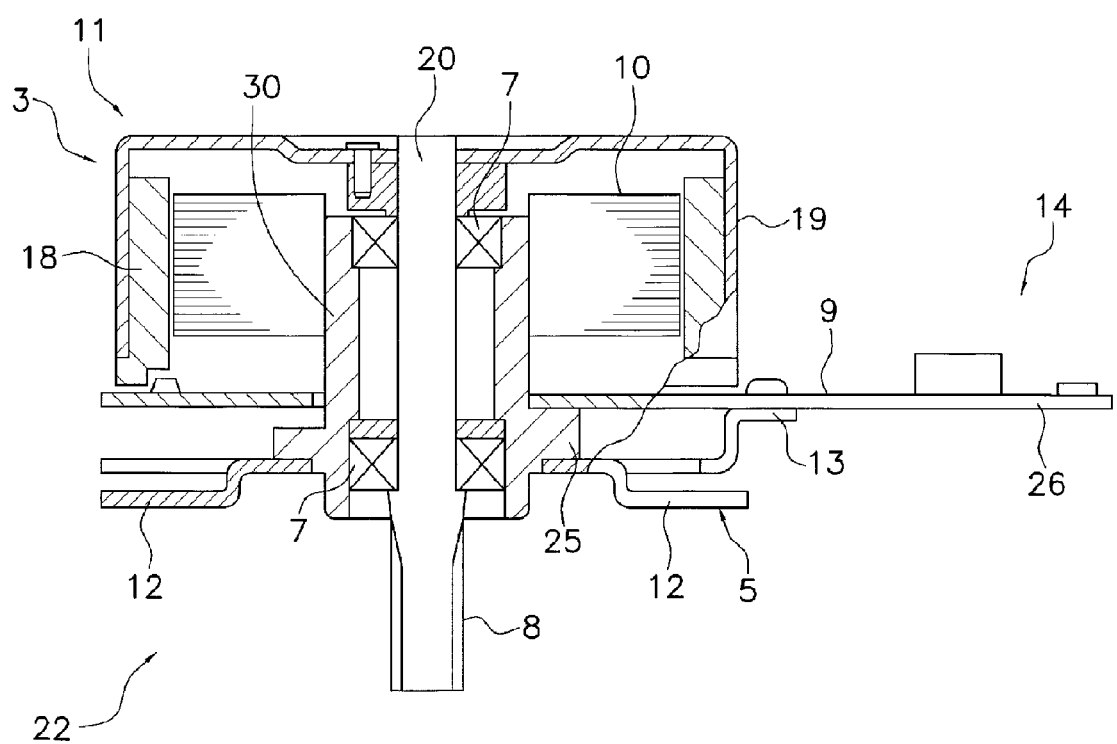
FIG. 8 is a cross-sectional view of a conventional motor 11.

Configuration—FIG. 1 is a cross-sectional view showing configuration of a motor 1 in accordance with the embodiment of the present invention, which is used for LBPs, copying machines, etc. The motor 1 has a static member 2 fixed to products such as LBPs and PPCs, a bearing 7 fixed to the static member 2 and a rotational member 3 rotatably supported with respect to the static member 2 through the bearing 7. The motor 1 is characterized by that the static member 2 comprises circuit boards in two layers (2 units). Parts and components corresponding to those of the conventional motor 11 in FIG. 8 are designated by the same reference numerals and description thereof is omitted.

The static member 2 as a characterizing part of the present invention will be described below.

Static member 2—The static member 2 has a bracket 5 for fixing the motor 1 to products such as LBPs and copying machines, a cylindrical sleeve 6, the lower part of which is penetrated into a through hole formed at the bracket 5 and fixed thereto, a first circuit board 31 fixed to the lower side of the sleeve 6, a second circuit board 32 fixed to the upper side of the sleeve 6 being spaced from the first circuit board 31 and a stator 10 fixed to the the upper side of the sleeve 30.

Bracket 5—The bracket 5 is a plate-like member on which a through hole is formed. A fitting piece 12 with a screw inserting hole is formed one stage lower at four corners of the bracket 5 with being folded, thereby fixing the motor 1 to the product.

Sleeve 6—The sleeve 6 is a substantially cylindrical member having a through hole at the center thereof. The sleeve 6 has a sleeve main body 60 comprised of an cylindrical part 61 and a stator supporting part 62, a first board supporting part 35 and a second board supporting part 37, and is formed integrally by die-cast or the like. The sleeve 6 is penetrated into and fixed to the through hole formed in the bracket 5 at its lower end and supported by the bracket 5 on a lower end plane 65 as a circular emitting surface extending the lower end part in the radial direction.

The cylindrical part 61 has a through hole at the center thereof and a pair of bearings 7 for rotatably supporting a shaft 20 of the rotating member 3 are fixed to the lower side and upper side of the inner periphery of the through hole, respectively.

The stator supporting part 62 has a substantially rectangular stator supporting plane 63 extending from a part of the outer periphery of the cylindrical part 61 in the radial direction and corresponds to a substantially columnar part extending from the stator supporting plane 63 to the lower end plane 65 in the axial direction. The outer periphery of the stator supporting part 62 is processed so as to correspond to a cylindrical surface concentric with the cylindrical part 61. The stator supporting plane 63 is formed from the top end of the sleeve 6 toward the lower side at a position apart by the thickness of the stator 10 in the axial direction. The stator supporting parts 62 are arranged on the outer periphery of the cylindrical part 61 at three positions at regular intervals. Accordingly, the sleeve main body 60 is formed so that the three positions on the outer periphery of the cylindrical part 61 trust in the radial direction.

Further, on the stator supporting part 62 is formed a screw hole from the stator supporting plane 63 toward the lower side in the axial direction and the stator 10 is fixed to the stator supporting part 62 by a screw.

The first board supporting part 35 has a first board supporting area 36 extending from a part of the outer periphery of the cylindrical part 61 in the shape of a fan in an outer diameter direction at its upper end and takes the form of a substantially columnar part extending from the first board supporting area 36 to the lower end plane 65 in the axial direction. The outer periphery of the first board supporting part 35 is processed so as to correspond to a cylindrical surface concentric with the cylindrical part 61 and has the same radius as the stator supporting part 62. The first board supporting parts 35 are arranged on the outer periphery of the cylindrical part 61 at three positions at regular intervals.

Further, on the first board supporting part 35 is formed a screw hole from the first board supporting area 36 toward the lower side in the axial direction and the first board 31 is fixed to the first board supporting part 35 by a screw 40. That is, the first board supporting part 35 supports the first board 31 to the upper side in the axial direction by using the first board supporting area 36 and fixes the first board 31 by using the screw 40.

The second board supporting part 37 has a second board supporting area 38 extending from the outer periphery of the cylindrical part 61 in the shape of a fan in an radial direction at its upper end and takes the form of a substantially columnar part extending from the second board supporting area 38 to the lower end plane 65 in the axial direction. The outer periphery of the second board supporting part 37 is processed so as to correspond to a cylindrical surface concentric with the cylindrical part 61 and has the same radius as the stator supporting part 62. The second board supporting parts 37 are arranged on the outer periphery of the cylindrical part 61 at three positions at regular intervals. That is, when the sleeve 6 is viewed from the lower side in the axial direction, the stator supporting part 62, the first board supporting part 35 and the second board supporting part 37 are arranged three times in a clockwise direction.

Further, on the second board supporting part 37 is formed a screw hole from the second board supporting area 38 toward the lower side in the axial direction and the second board 32 is fixed to the second board supporting part 37 by a screw 41. That is, the second board supporting part 37 supports the second board 32 to the upper side in the axial direction by using the second board supporting area 38 and fixes the second board 32 by using the screw 41.

Next, positional relationship between the first board supporting area 36 and the second board supporting area 38 in the axial direction will be described. The first board supporting area 36 and the second board supporting area 38 are provided with a distance therebetween in the axial direction. For example, the second board supporting area 38 is provided so that the leading end face of the second board 32 attached to the second board supporting area 38 is spaced from the rotor 19 or the magnet 18 of the rotating member 3. Further, the first board supporting area 36 is provided so as to leave a distance from the second board supporting area 38 toward the lower side. Here, the distance refers to a distance set depending on, for example, a thickness in the axial direction of a circuit component arranged on the upper end face of the first board 31 or the lower end face of the second board 32. More specifically, it refers to a distance by which circuit components arranged on the upper end face of the first board 31 and the lower end face of the second board 32 do not come contact with each other in the axial direction.

Figure 2:
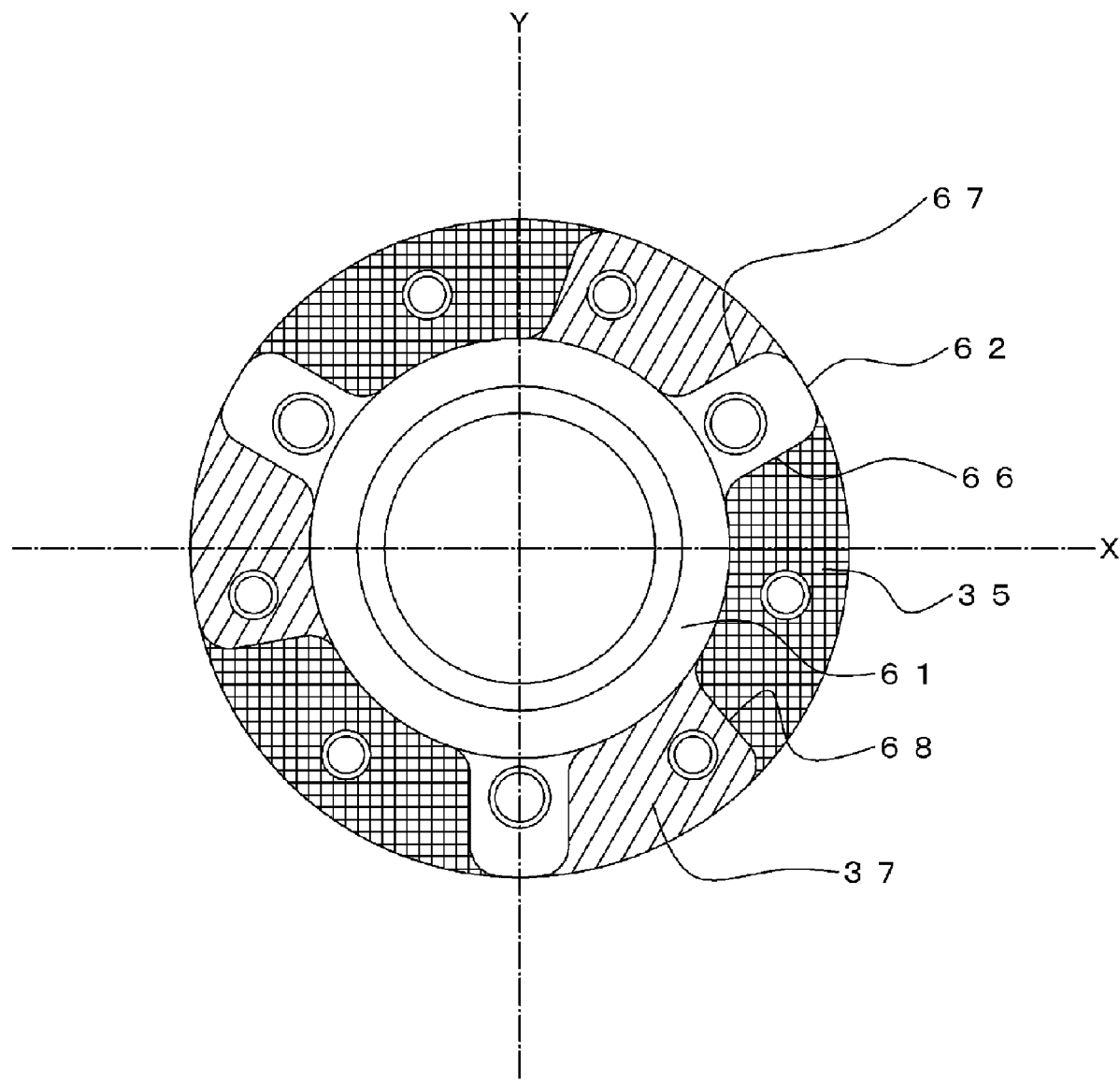
FIG. 2 is a perspective view of a sleeve 6 of the present invention viewed from an upper side in an axial direction.

FIG. 2 is a plan view of the sleeve 6 viewed from the upper side in the axial direction. As described above, a set of the stator supporting part 62, the first board supporting part 35 and the second board supporting part 37 is arranged three times in a clockwise direction. Further, the stator supporting part 62, the first board supporting part 35 and the second board supporting part 37 are arranged at regular intervals on the outer periphery of the cylindrical part 61. For example, the stator supporting part 62 is located every 120 degrees on the outer periphery of the cylindrical part 61. This also applies to the first board supporting part 35 and the second board supporting part 37.

Figure 3:
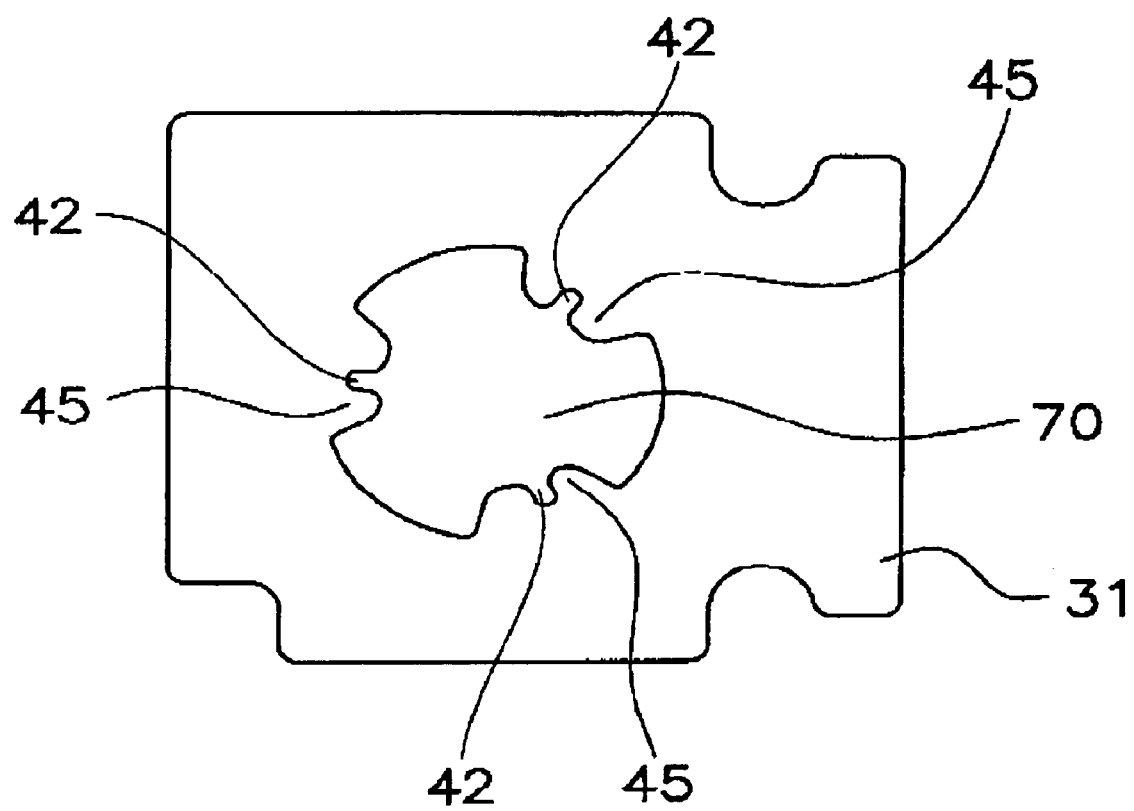
FIG. 3 is a cross-sectional view of the sleeve 6 of the present invention.

FIG. 3 is a cross-sectional view of the sleeve 6 viewed from an X direction in FIG. 2. Cross section of the sleeve 6 viewed from a Y direction is shown in FIG. 1. The stator supporting plane 63 of the stator supporting part 62 is situated next to the first board supporting area 36 of the first board supporting part 35 through a step plane 66 in the axial direction and next to the second board supporting area 38 of the second board supporting part 37 through a step plane 67 in the axial direction. The length in the axial direction of the step plane 67 allows a distance between the stator 10 and the second board 32 in the axial direction to be ensured. Further, the second board supporting area 38 of the second board supporting part 37 is situated next to the first board supporting area 36 of the first board supporting part 35 through a step plane 68 in the axial direction. The length in the axial direction of the step plane 68 allows a distance between the second board 32 and the first board 31 in the axial direction.

The screw holes formed in the stator supporting part 62, the first board supporting part 35 and the second board supporting part 37, respectively, are arranged on the outer periphery of the cylindrical part 61 at regular intervals. That is, the screw hole of the stator supporting part 62, the screw hole of the first board supporting part 35 and the screw hole of the second board supporting part 37 are each arranged on the outer periphery of the cylindrical part 61 at 40 degrees intervals.

First board 31—FIG. 3 is a top view of the first board 31 viewed from the upper side in the axial direction. The first board 31 is a substantially rectangular member, three corners of which are cut and has a first inserting hole 70 about at the center thereof The first inserting hole 70 is formed so that the sleeve main body 60 and the second board supporting part 37 are passed therethrough. Further, a first board supported part 45 is formed on the border of the first inserting hole 70 so as to protrude toward the inside of the first inserting hole 70. The first board supported part 45 is provided as opposed to the first board supporting area 36 in the axial direction. In other words, just as the first board supporting parts 36 are arranged on the outer periphery of the cylindrical part 61 at regular intervals, the first board supported parts 45 are arranged on the border of the first inserting hole 70 at three positions at regular intervals. Further, a notch 42 (holes may be provided) is formed at the first board supported part 45 at the position corresponding to the screw hole formed in the first board supporting part 35.

The shape of the first inserting hole 70 will be described in more detail. The first inserting hole 70 is formed so as to substantially correspond to the peripheral form of radial cross-section between the first board supporting area 36 and the second board supporting area 38 of the sleeve 6. That is, the first inserting hole 70 is formed so as to have a larger radius than the outer periphery of the stator supporting part 62 or the second board supporting part 37. Further, on the border of the first inserting hole 70 is formed the first board supported part 45 protruding inwards in the radius direction by a length not exceeding a difference between a radius of the outer periphery of the first board supporting parts 35 and that of the outer periphery of the cylindrical part 61.

Figure 4:
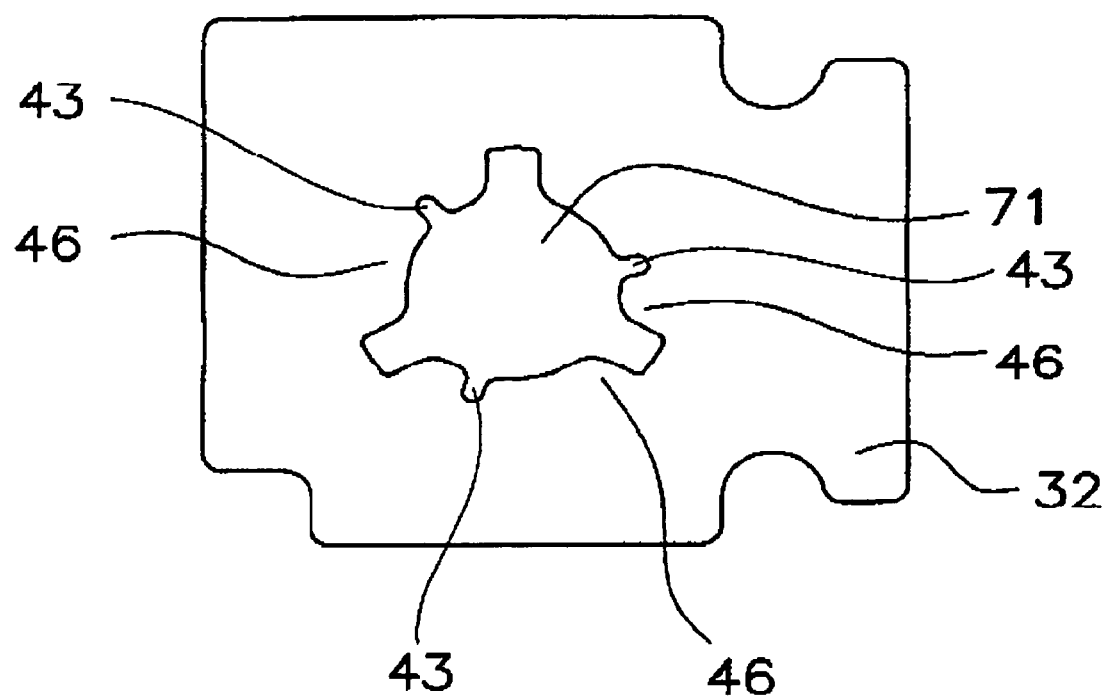
FIG. 4 is a top view of a first board 31 viewed from an upper side in an axial direction.
Figure 5:
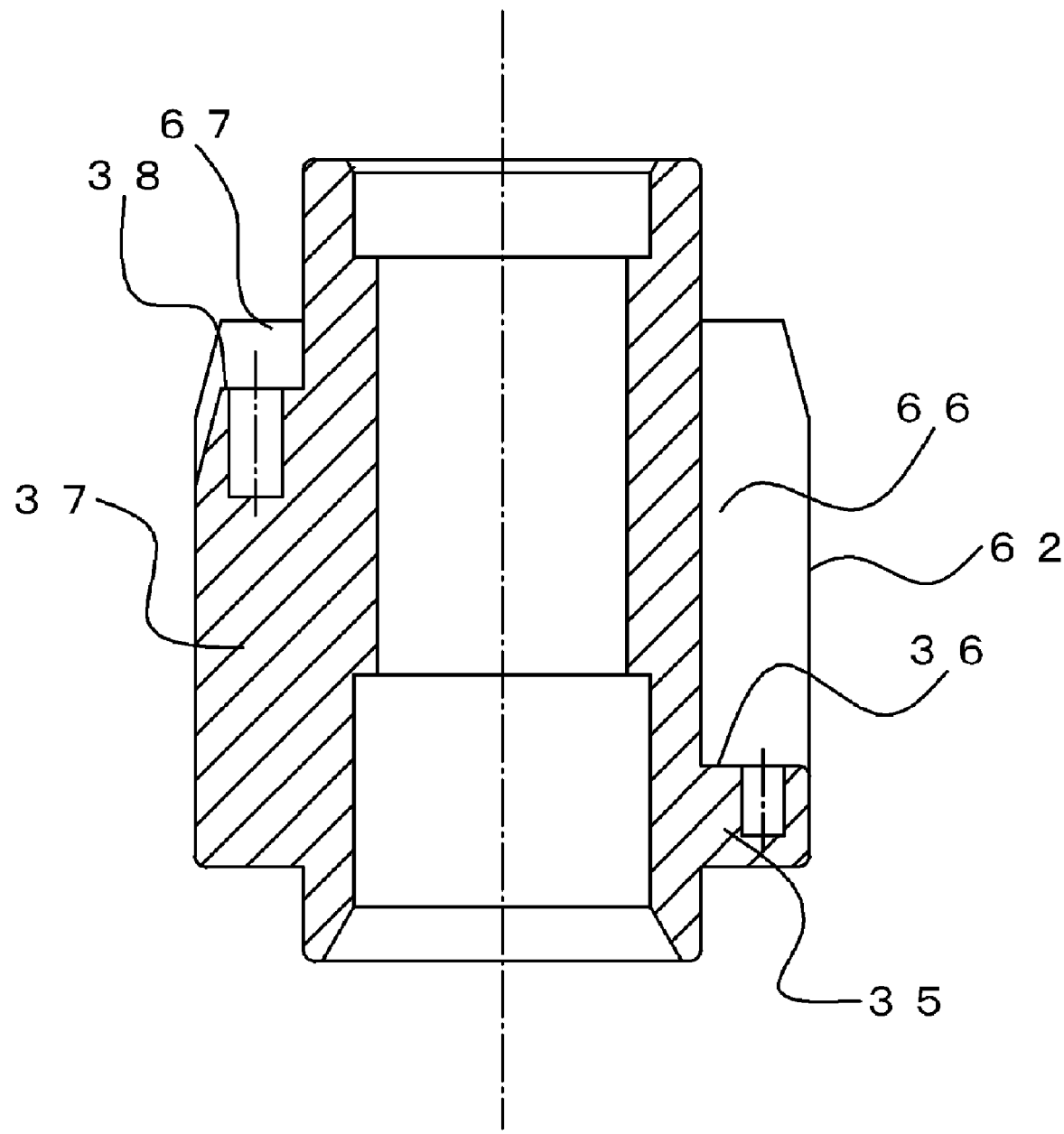
FIG. 5 is a top view of a second board 32 viewed from an upper side in an axial direction.

Second board 32 —FIG. 4 is a top view of the second board 32 viewed from the upper side in the axial direction. The second board 32 is a substantially rectangular member, three corners of which are cut and has a second inserting hole 71 about at the center thereof. The second inserting hole 71 is formed so that the sleeve main body 60 is passed therethrough. Further, a second board supported part 46 is formed on the border of the second inserting hole 71 so as to protrude toward the insaid of the second inserting hole 71. The second board support part 46 is provided as opposed to the second board supporting area 38 in the axial direction. In other words, just as the second board supporting parts 37 are arranged on the outer periphery of the cylindrical part 61 at regular intervals, the second board supported parts 46 are arranged on the board of the second inserting hole 71 at three position at regular intervals. Futher, a notch 43 (through hole may be provided) is formed at the second board supported part 46 at the position corresponding to the screw hole formed in the second board supporting part 37.

The shape of the second inserting hole 71 will be described in more detail. The second inserting hole 71 is formed so as to substantially correspond to the peripheral form of radial cross-section between the second board supporting area 38 and the stator supporting plane 63 of the sleeve 6. That is, the second inserting hole 71 is formed so as to have a larger radius than the outer periphery of the stator supporting part 62. Further, on the border of the second inserting hole 71 is formed the second board supported part 46 protruding inwards in the radius direction by a length not exceeding a difference between a radius of the outer periphery of the second board supporting parts 37 and that of the outer periphery of the cylindrical part 61.

Electrical connection—Operation of the motor 1 is the substantially same as the operation of the motor 11 described with reference to FIG. 8. However, in the motor 1, the circuit board consists of two boards of the first board 31 and the second board 32 and these boards are electrically connected to each other with a connecting part 75 (refer to FIG. 1). Feeding of power and grounding of the circuit board is performed by the first board 31.

Manufacturing method—The motor having the above-mentioned configuration is manufactured according to the following method.

Firstly, the bracket 5 is attached to the sleeve 6 from the lower side in the axial direction. The through hole formed in the bracket 5 is made to contact against the lower end plane 65 of the sleeve 6, so that the sleeve 6 is passed through the through hole for fixation.

Next, the first board 31 is attached to the sleeve 6 from the upper side in the axial direction. At this time, the first board 31 is attached so that the first board supported part 45 is opposed to the first board supporting area 36 while the sleeve main body 60 and the second board supporting parts 37 are made to be passed through the first inserting hole 70. At this time, since the first inserting hole 70 and the first board supported part 45 are guided by the step plane 66 and the step plane 68 of the sleeve 6 and passed therethrough, attachment is easily performed at a correct position. Moreover, the screw 40 is inserted into the three notches formed at the first board supported part 45 to fix the first board 31 to the sleeve 6.

The second board 32 is also attached to the sleeve 6 from the upper side in the axial direction. After the first board 31 is attached to the sleeve 6, the second board 32 is attached so that the second board supported part 46 is opposed to the second board supporting area 38 while the sleeve main body 60 is made to be passed through the second inserting hole 71. At this time, since the second inserting hole 71 and the seocnd board supported part 46 are guided by the step plane 66 and the step plane 67 of the sleeve 6 and passed therethrough, attachment is easily performed at a correct position. Moreover, the screw 41 is inserted into the three notches formed at the second board supported part 46 to fix the second board 32 to the sleeve 6. Subsequently, the connecting part 75 is soldered to electrically connect the first board 31 to the second board 32.

Similarly, the stator 10 is attached to the sleeve 6 from the upper side in the axial direction. A screw hole is formed in the stator supporting part 62 from the stator supporting plane 63 toward the lower side in the axial direction and the stator having a coil is screwed to the stator supporting plane 62.

Next, one bearing 7 is incorporated into the shaft 20 from the lower side in the axial direction and fixed, and then the shaft 20 is inserted into the sleeve 6 and fixed to the cylindrical part 61.

Another bearing 7 is incorporated into the shaft 20 set in the sleeve 6 from the upper side in the axial direction and fixed, and then the rotor 19 into which the magnet 18 is fixedly fitted is attached and fixed. The magnet 18 fixedly fitted into the rotor 19 is attached so as to opposed to the stator 10 fixedly fitted onto the sleeve 6 with a small space.

By assembling the motor as described above, the two circuit boards can be attached to the sleeve 6 easily and accurately and further, assembling process can be simplified.

Modifications—The present invention is not limited to the above-mentioned embodiments and can be varied or modified without deviating from the scope of the present invention.

1. The present invention is not limited by the shape of the rotating member 3. That is, the present invention can apply to the motor 1 of outer rotor type described in the embodiment as well as motors of inner rotor type with a common-sense modification in shape.

For example, in motors of inner rotor type, the first supporting part and the second supporting part can be formed in a stepped fashion on the outer or inner periphery of the cylindrical part of which the stator is fixed to the inner periphery plane.

2. The present invention is not limited by the number of circuit boards. That is, the present invention can apply to motors having three or more circuit boards with a common-sense modification in shape.

For example, as to the sleeve 6, a third board supporting part or much more board supporting parts can be provided with the outer periphery of the cylindrical part 61.

In the case that the motor has m circuit boards, an $m^{th}$ inserting hole formed in an $m^{th}$ board is formed so as to make the sleeve main body 60 pass therethrough and an nth inserting hole formed in an $n^{th}$ board is formed so as to make an $(n+1)^{th}$ board supporting part to an $m^{th}$ board supporting part and the sleeve main body 60 pass therethrough.

3. The stator supporting part 62, the first board supporting part 35 and the second board supporting part 37 need not be necessarily arranged on the outer periphery of the cylindrical part 61 at regular intervals. Further, the screw holes formed in these parts need not be necessarily arranged on the outer periphery of the cylindrical part 61 at regular intervals.

Further, effect of the present invention is not limited by the number of the stator supporting part 62, the first board supporting part 35 and the second board supporting part 37.

For example, the stator supporting part 62, the first board supporting part 35 and the second board supporting part 37 each may be provided in one or more. Preferably, when these parts each are provided in three or more, the circuit board can be supported stably.

Furthermore, the stator supporting part 62, the first board supporting part 35 and the second board supporting part 37 need not be necessarily arranged in succession on the outer periphery of the cylindrical part 61.

For example, the stator supporting part 62, the first board supporting part 35 and the second board supporting part 37 may be arranged at intervals in the circumferential direction.

4. The present invention is not limited by the shape of the sleeve main body 60. That is, the sleeve main body 60 need not necessarily include the stator supporting part 62.

For example, the stator 10 may be directly fixed to the cylindrical part 61.

5. Fixation of the first board 31 and the second board 32 to the first board supporting part 35 and the second board supporting part 37 need not be performed by using the screws.

For example, the fixation may be performed by bonding the first board supporting area 36 to the first board supported part 45 or using pins such as pressing pins.

6. The shape of the inserting hole formed in the first board 31 or the second board 32 is not limited to the shape as described in the embodiment.

For example, the second inserting hole 71 may be formed at the position corresponding to the stator supporting part 62 as well as the position corresponding to the first board supporting part 35.

Further, the notches for screw formed at the first board supported part 45 and the second board supported part 46 may take the other shape. For example, through holes for screw may be provided.

7. According to the present invention, uses for the motor 1 is not limited to LBPs and copying machines. In other words, the motor 1 may have uses other than for LBPs and copying machines.

8. The shape of the sleeve 6 is not limited to the shape as described in the embodiment.

For example, the first board supporting area 36 and the second board supporting area 38 may be formed so as to partially overlap each other when viewed from the upper side in the axial direction.

Figure 6:
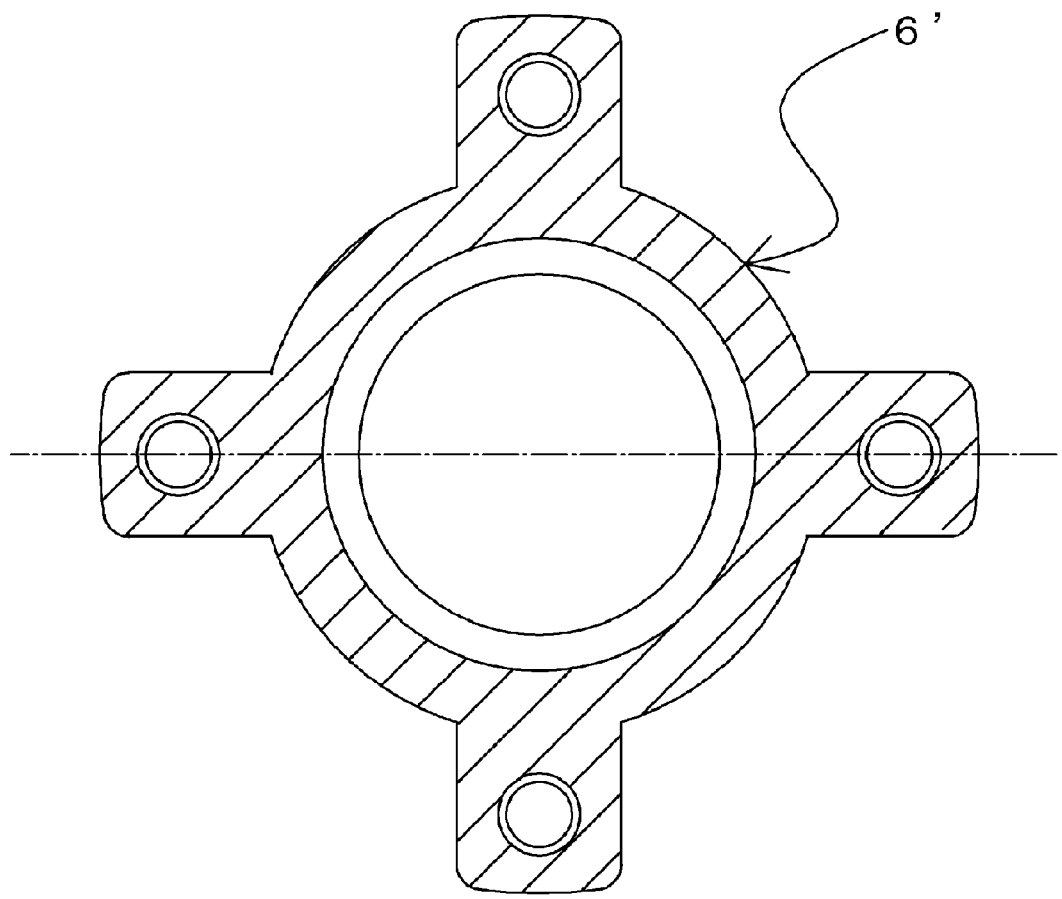
FIG. 6 is a perspective view of a sleeve 6' of the present invention viewed from an upper side in an axial direction.
Figure 7:
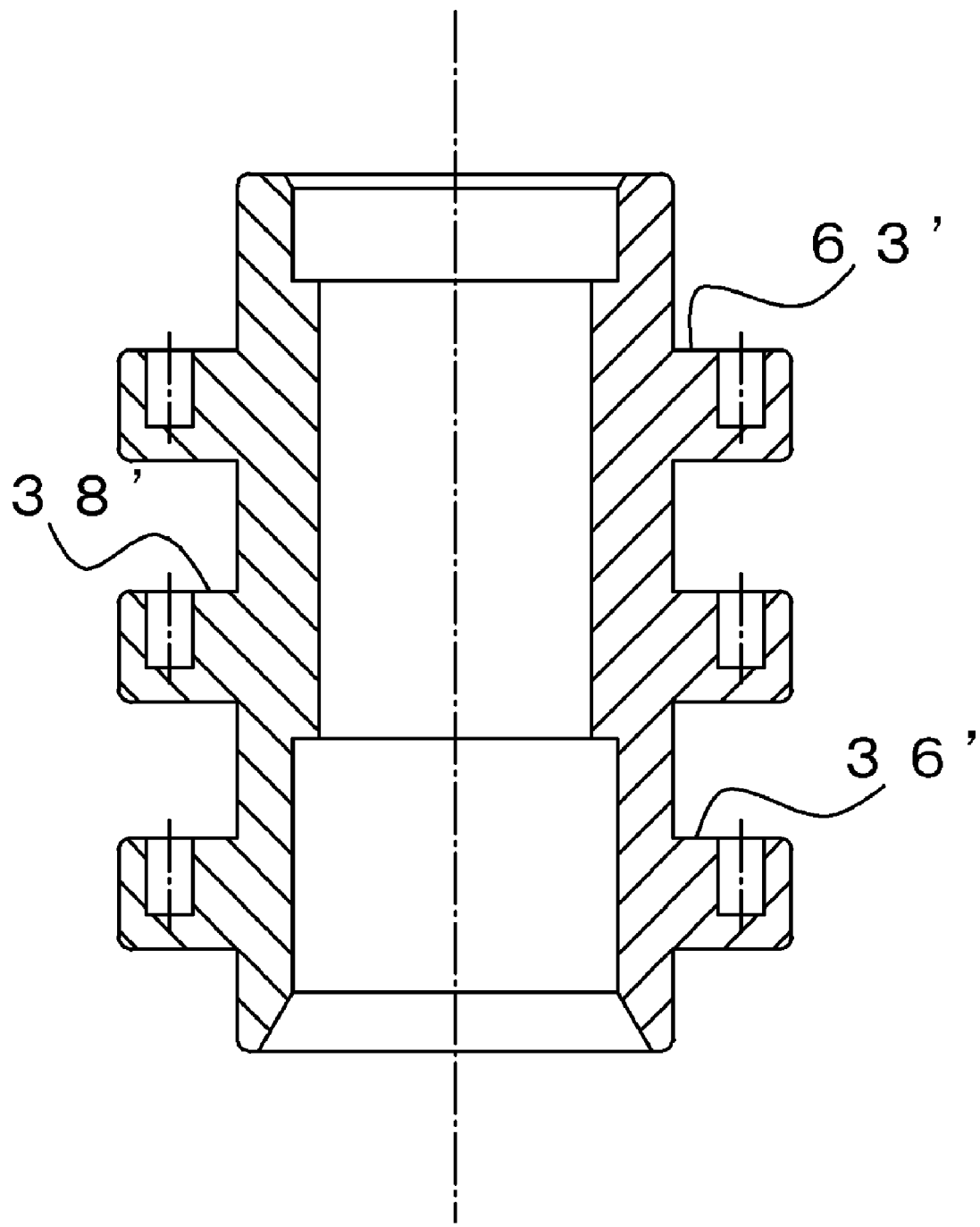
FIG. 7 is a cross-sectional view of the sleeve 6' of the present invention.

Further, the first board supporting area 36 and the second board supporting area 38 may be configured to completely overlap each other in the axial direction. More specifically, the shape of the sleeve 6' is shown in FIG. 6 and FIG. 7, the sleeve supporting plane 63', the first board supporting area 36' and the second board supporting area 38' may be aligned in the axial direction.

Since such shape of the sleeve enables the first board 31 and the second board 32 to have the inserting holes and the board supporting parts of the same shape, manufacturing process of the circuit boards can be simplified.

In incorporating the circuit boards, the first board 31 is inserted into the first board supporting part 35 from the upper side of the sleeve 6 in the axial direction so that the first board supported part 45 is opposed to the first board supporting area 36 while the sleeve main body 60 and the second board supporting parts 37 are made to be passed through the first inserting hole 70. Similarly, the second board 32 is also inserted into the second board supporting part 37 so that the second board supported part 46 is opposed to the second board supporting area 38 while the sleeve main body 60 is made to be passed through the second inserting hole 71.

Further, the first board supporting area 36 and the second board supporting area 38 may be formed so as to have no overlap when viewed from the upper side in the axial direction.

The step plane 68 that makes the first board supporting area 36 and the second board supporting area 38 to be continuous may be formed so as to extend a slope in the axial direction and the first board supporting area 36 and the second board supporting area 38 may be formed so as to have no overlap when viewed from the upper side in the axial direction.

In this case, since there is free space in the axial direction, it is convenient to fix the circuit board with screw or pin.

9. The forming method of the sleeve 6 is not limited to the method as described in the embodiment.

For example, the sleeve 6 may be formed by having the cylindrical part 61 and a separate member consisting of the stator supporting part 62, the first board supporting part 35 and the second board supporting part 37 and fixing the separate member to the cylindrical part 61. At this time, the separate member consisting of the stator supporting part 62, the first board supporting part 35 and the second board supporting part 37 is formed of conductive material and may be formed by using methods such as die-cast, press, forging and machine work or by casting resin material.

Effects—The motor of the present invention has the following effects.

1. Since there is space between the first board 31 and the second board 32 in the motor 1 of the present invention, it is unnecessary to use a special member such as spacer. That is, according to the present invention, the configuration of the two-layer board is achieved by only applying necessary process to the inserting hole of the board and the sleeve 6. For this reason, costs of the motor 1 can be reduced.

2. Since the first board 31 and the second board 32 are fixed with three or more first board supporting parts 35 and the second board supporting parts 37 in the motor 1 of the present invention, these boards can be supported stably.

3. In the motor 1 of the present invention, the first board 31 and the second board 32 can be supported at the center of gravity of these boards and therefore, the boards can be supported with respect to the sleeve 6 stably. Further, since the boards are supported with a plurality of first board supporting parts 35 and the second board supporting parts 37, which are arranged at regular intervals, the boards can be supported with respect to the sleeve 6 more stably.

4. In the motor 1 of the present invention, to obtain the configuration for supporting the first board 31 and the second board 32, the perimeter of the inserting hole of each board is processed. For this reason, the board can be easily processed, for example, the first inserting hole 70 and the first board supported part 45 can be processed simultaneously.

Further, the inserting holes formed in the first board 31 and the second board 32 each are formed as one hole. For this reason, the board can be easily processed.

5. In the motor 1 of the present invention, the first board 31 and the second board 32 can be fixed in the axial direction by using the screws 40 and 41.

6. In the motor 1 of the present invention, the first board 31 and the second board 32 can be fixed in the axial direction by using pressing pins.

7. The first inserting hole 70 and the second inserting hole 71 are formed in the shape corresponding radial cross-section between the upper sides of the first board supporting area 36 and the second board supporting area 38, respectively, and the sleeve 6. Accordingly, when attaching the first board 31 and the second board 32, these boards can be aligned easily and in particular, these boards can be easily oriented in the circumferential direction. Further, it becomes possible to prevent the first board 31 and the second board 32 from being mixed up. Consequently, according to the present invention, it becomes possible to provide the easy-to-assemble motor.

This application is based on Japanese Patent Application serial no. 2003-420564 filed in Japan Patent Office on Dec. 18, 2003, the contents of which are hereby incorporated by reference.

Although the present invention has been fully described by way of example with reference to the accompanying drawings, it is to be understood that various changes and, modifications will be apparent to those skilled in the art. Therefore, unless otherwise such changes and modifications depart from the scope of the present invention hereinafter defined, they should be construed as being included therein.

What is claimed is:

1. A motor in which circuit boards for controlling the motor are attached within a housing comprising:
    two or more circuit boards each having an inserting hole whereby the inner diameter of each board is approximately the same;
    a rotating part having at least one rotor magnet arranged in a circular manner;
    a stator having a coil which is connected to circuits of the circuit boards, the stator located confronting the rotor magnet in radial direction;
    a cylindrical sleeve for fixing an inner periphery of the stator to an outer periphery surface thereof including:
        board attached virtual planes of two or more layers at which the two or more circuit boards are positioned, which are separately arranged in parallel to each other and board attachment portions formed at an outer periphery of the sleeve, wherein the board attachment portions have board supporting areas for fixing the circuit boards, and each circuit board penetrated by the sleeve through the inserting hole and fixed to the board attachment portion;

a bracket for fixing the sleeve; and a bearing part arranged between an outer periphery of the rotating part and an inner periphery of the sleeve for supporting the rotating part so as to rotate about a rotational axis.

2. A motor as set forth in claim 1, wherein the board supporting areas corresponding to each layer of the two or more layers are configured to have no overlap each other in top view.

3. A motor as set forth in claim 1 wherein the board supporting areas corresponding to each layer of the two or more layers are configured to partially overlap each other in top view.

4. A motor as set forth in claim 1, wherein the board supporting areas corresponding to each layer of the two or more layers are configured to completely overlap each other in top view.

5. A motor as set forth in claim 1, wherein the inserting hole of a first circuit board which is located at the lowest is formed so as to penetrate not only the cylindrical sleeve but also board attachment portions for attaching other circuit boards other than the first circuit board.

6. A motor as set forth in claim 5, wherein the inserting hole of the circuit board is formed at substantially center of the circuit board and the center of gravity of the board exists at least in the inserting hole.

7. A motor as set forth in claim 5, wherein a board attaching hole is opened on the circuit board and the board attaching hole is formed next to the inserting hole.

8. A motor as set forth in claim 7, wherein the circuit boards are fixed to the sleeve by screwing the circuit boards along the board attaching holes to the board attachment portions.

9. A motor as set forth in claim 7, wherein the circuit board are fixed to the sleeve by inserting pressing pins through the circuit boards along the board attaching holes and into the board attachment portions.

10. A motor as set forth in claim 1, wherein the board attachment portions are formed as a member separate from the sleeve and the board attachment portions are fixedly held by the sleeve.

11. A motor as set forth in claim 10, wherein the board attachment portions formed as a member separate from the sleeve are manufactured by molding or pressing.

12. A motor as set forth in claim 10, wherein the board attachment portions formed as a member separate from the sleeve are made of conductive material.

13. A method of manufacturing the motor as set forth in claim 1, wherein the method comprising steps of;

insertig the inserting hole of the circuit board into the sleeve from the upper side having the rotating part toward the lower side having the bracket, getting the board attachment portions other than the circuit board therethrough, bringing the board attachment portions into contact with the board supporting area corresponding the circuit boards, and then fixing the circuit board.

14. A motor in which circuit boards for controlling the motor are attached within a housing comprising:

first and second circuit boards each having an insertion hole whereby the inner diameter of each board is approximately the same;

a rotating part having at least one rolor magnet arranged in a circular manner;

a stator having a coil which is connected to circuits of the circuits boards, the stator located confronting the rotor magnet in radial direction;

a cylindrical sleeve for fixing an inner periphery of the stator to an outer periphery surface thereof including:

a first board attachment portion having a first board supporting area extending in the radial direction of the sleeve; and a second board attachment portion having a second board supporting area that extends in the radial direction of the sleeve and is formed to be apart from the first board supporting area in the axial direction of the sleeve; wherein the first board has a first inserting hole into which the sleeve and the second board attachments portion are inserted and is fixed to the first board supporting area, and the second board has a second inserting hole into which the sleeve main body is inserted and is fixed to the second board supporting area;

a bracket for fixing the sleeve; and a bearing part arranged between an outer periphery of the rotating part and an inner periphery of the sleeve for supporting the rotating part so as to rotate about a rotational axis.

15. A motor as set forth in claim 14, wherein the sleeve has three or more board attachment portions arranged at rotational symmetry manner around the rotational axis for each circuit board.

16. A motor as set forth in claim 14, wherein the board attachment portions have board supporting areas for fixing the circuit board and the board supporting areas corresponding to each layer of the two layers are configured to have no overlap in top view.

17. A motor as set forth in claim 14, wherein the board attachment portions have board supporting areas for fixing the circuit board and the board supporting areas corresponding to each layer of the two layers are configured to partially overlap each other in top view.

18. A motor as set forth in claim 14, wherein the board attachment portions have board supporting areas for fixing the circuit board and the board supporting areas corresponding to each layer of the two layers arc configured to completely overlap each other in top view.

19. A motor as set forth in claim 14, wherein the inserting hole of the circuit board is formed at substantially center of the circuit board and the center of gravity of the board exists at least in the inserting hole.

20. A motor as set forth in claim 14, wherein a board attaching hole is opened on the circuit board and the board attaching hole is formed next to the inserting hole.

21. A motor as set forth in claim 20, wherein the circuit boards are fixed to the sleeve by screwing the circuit boards along the board attaching holes to the board attachment portions.

22. A motor as set forth in claim 20, wherein the circuit boards are fixed to the sleeve by inserting pressing pins through the circuit boards along the board attaching holes and into the board attachment portions.

23. A motor as set forth in claim 14, wherein the board attachment portions are formed as a member separate from the sleeve and the board attached part is fixedly held by the sleeve.

24. A motor as set forth in claim 23, wherein the board attachment portions formed as a member separate from the sleeve are manufactured by molding or prossing.

25. A motor as set forth in claim 23, wherein the board attachment portions formed as a member separate from the sleeve are made of conductive material.

26. A method of manufacturing the motor as set forth in claim 14 comprising the steps of:
   to the sleeve, fixing the bracket;
   inserting the first inserting hole of the first board from the upper side having the rotating part toward the lower side having the bracket, getting the second board attached part other than the circuit board therethrough, bringing the second board attached part into contact with the first board supporting area and then fixing to the first attached part; and
   inserting the second inserting hole of the second board from the upper side toward the lower side, bringing the second board attached part into contact with the board supporting area of the second board and then fixing to the second attached part.

27. A motor in which circuit boards for controlling the motor are attached within a housing, the motor comprising:
   two or more circuit boards each having an inserting hole;
   a rotating part having at least one rotor magnet arranged in a circular manner;
   a stator having a coil which is connected to circuits of the circuit boards, the stator located confronting the rotor magnet in radial direction;
   a cylindrical sleeve for fixing the stator to the periphery thereof including:
      board attached virtual planes of two or more layers at which the two or more circuit boards are positioned, which are separately arranged in parallel to each other and board attachment portions formed at the periphery of the sleeve, wherein the board attachment portions have board supporting areas for fixing the circuit boards, the sleeve has Three or more board attachment portions arranged at rotational symmetry manner around the rotational axis for each circuit board, and
      each circuit board penetrated by the sleeve through the inserting hole and fixed to the board attachment portion;
   a bracket for fixing the sleeve; and
   a bearing part arranged between the rotating part and the sleeve for holding the rotating part so as to rotate about a rotational axis.

28. A motor as set forth in claim 27, wherein the inserting hole of the circuit board is formed at substantially center of the circuit board and the center of gravity of the board exists at least in the inserting hole.

29. A motor as set forth in claim 27, wherein a board attaching hole is opened on the circuit board and the board attaching hole is formed next to the inserting hole, and the circuit board is fixed to the sleeve by screwing the board attaching hole and the board attachment portion.

* * * * *